Oct. 9, 1956  E. R. GILMORE  2,765,657
DRIVE SHAFT JOURNALING MECHANISM FOR GAS METERS
Filed Jan. 28, 1953
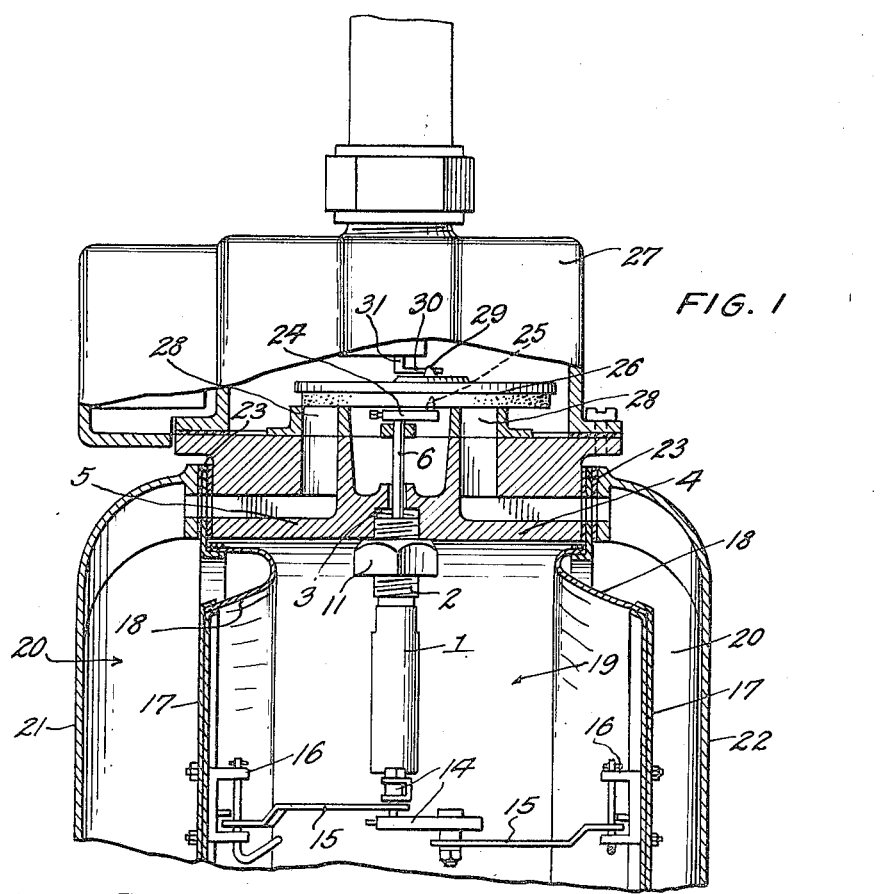
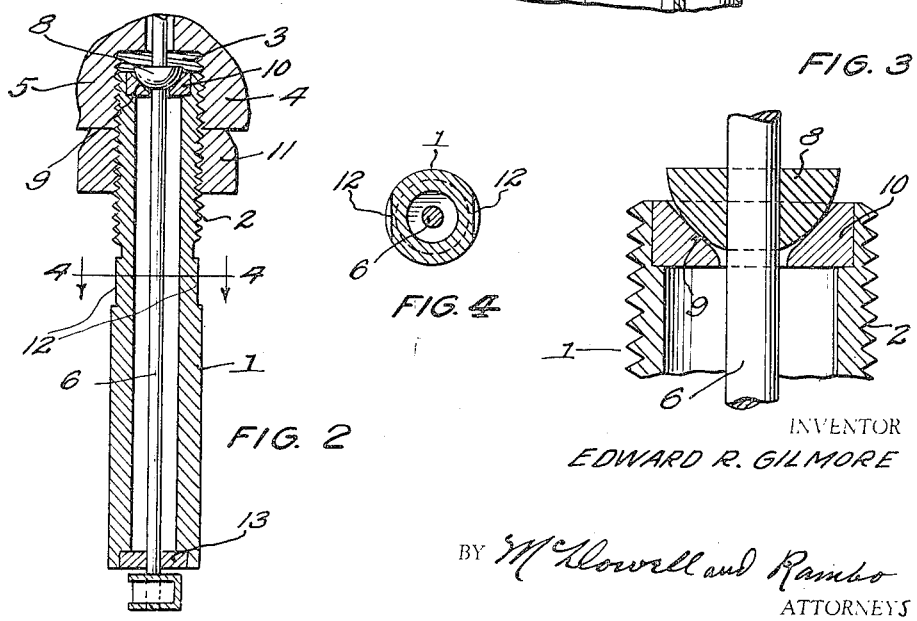
INVENTOR
EDWARD R. GILMORE
BY McDowell and Rambo
ATTORNEYS United States Patent Office 2,765,657
Patented Oct. 9, 1956

2,765,657

DRIVE SHAFT JOURNALING MECHANISM FOR GAS METERS

Edward R. Gilmore, Tulsa, Okla., assignor to Karl L. Schaus, Lancaster, Ohio

Application January 28, 1953, Serial No. 333,776

2 Claims. (Cl. 73—272)

This invention relates to fluid flow indicating meters, having particular reference to diaphragm-actuated flow meters of the type utilized in registering volumetrically the flow of gas through conduits.

More specifically, the present invention is concerned with the provision of an improved supporting mechanism for receiving for rotation the drive shaft of a gas meter. Such a mechanism is often referred to as constituting the "main movement" of a diaphragm-type gas meter.

To provide a clear understanding of my invention, it may be stated that the function of the parts comprising the so-called main movement, as found in diaphragm-actuated gas meters, is to transmit motion in a coordinated manner to an eccentrically rotated gas flow-controlling valve from a pair of pulsating diaphragms arranged in the main body portion of the meter case. Such a main movement includes a shaft-supporting housing member which has its upper end stationarily threaded into a socket formed in the top of the main body portion of the case. In this construction, the shaft is journaled for rotation in a pair of main bearings, one of which is provided in the case itself, and the other in the housing member. Through a crank and link motion connected with the bottom of the shaft, rotary motion is imparted to the latter upon diaphragm pulsation. Likewise, through a crank or tangent arm carried by the upper end of the drive shaft, rotary eccentric motion is imparted to the gas flow-regulating valve, whereby to open and close inlet and outlet passages communicating with the respective diaphragm chambers of the meter.

It is a difficult task to install properly such a main movement in a gas meter of the character set forth. The difficulty is attributable in part to the fact that the housing for the drive shaft as presently constructed is formed from a relatively soft, moldable metal, usually white metal. The upper end of the housing includes tapered screw threads which are adapted to be received in a correspondingly tapered and threaded socket provided in the meter case at the top thereof. The lower part of the housing is formed with a bearing opening for the reception of the valve-rotating drive shaft, while another main bearing is formed in the top of the body case, separate from the housing, for the rotatable support of the shaft. These two shaft bearings, found in different meter parts, obviously make it difficult to align properly the shaft bearings in a manner avoiding undue binding on the part of the shaft and the elimination of excess friction. In such meters, the operation of centering the shaft is highly important. With the presently used type of main movement of such a meter, in efforts to obtain proper shaft centering and bearing alignment, it is a common practice for the installer to tap the housing with a hammer or the like to bend its soft metal composition to a desired shaft-centering position. This practice often results in throwing other binds on the drive shaft, making further hammering necessary.

Again, the present molded type of shaft housing, by having tapered threads formed on its upper end, is, in effect, nonadjustable vertically when the same is operatively positioned in a meter. Therefore, it cannot be adjusted to govern the operating plane of the diaphragm-linked tangent arm carried by the lower end of the shaft at the bottom of the housing. Also, when the relatively soft bearing in the housing becomes worn, uncontrolled gas seepage and gas loss take place through the housing and the worn bearings, necessitating the replacement in many cases of the entire housing.

With these and other objects in view, it is a primary object of the present invention to provide a main movement for diaphragm-actuated gas meters wherein an improved support is provided for maintaining an associated drive shaft in a centered position at all times and in a convenient and readily accomplished manner.

It is another object of the present invention to provide a main drive shaft movement for gas meters in which a housing member is provided composed of a length of rigid steel tubing, and which is not subject to wear or deformation as are the molded soft metal housings of the prior art.

Another object is to provide a steel housing member for the support of the drive shaft of a gas meter which has the upper end thereof provided with straight threads, as contrasted with the tapered threads of the prior art, the straight threads being receivable in a similarly formed socket provided in the top wall of the main meter case, there being a binding nut threaded on the housing member for maintaining the vertical adjustment of said member in adapting the same to the plane of operation of the tangent arm and linkage joined with the lower end of the shaft journaled in the housing member.

A further object of the invention is to provide a tubular housing member of a main meter movement with replaceable bearings which are adapted to receive the diaphragm driven valve-operating shaft, the bearings being of different composition from the housing member to provide long wear with little attention or lubrication.

It is a further object of the invention to provide a main meter movement of the character indicated in which bearings are provided in the upper and lower ends of the housing member so that the associated drive shaft may be centered within the confines of the housing itself and in a manner independently of the meter case.

Still a further object of this invention is to provide a novel means of obtaining a self-centering and seating bearing in the top of the drive shaft and housing member, thus making it possible to align the drive shaft by providing the housing member with a conical seating bearing on the drive shaft with a self-centering spherical bearing, the spherical bearing having line contact with the conical seating bearing, whereby to produce a main movement for the meters of the type set forth in which the drive shaft is maintained at all times in a centered position within an unbendable steel housing, and wherein undesirable stresses or binds on the drive shaft are eliminated or minimized, as well as frictional drag on the operation of the shaft.

For a further understanding of the invention, reference is to be had to the following description and the accompanying drawing, wherein:

Fig. 1 is a fragmentary vertical sectional view taken through the body portion of the case of a diaphragm type of meter, and disclosing a main movement formed in accordance with the present invention;

Fig. 2 is a detailed vertical sectional view taken through the main movement;

Fig. 3 is a similar view on an enlarged scale, and disclosing more particularly the construction of the spherical bearing carried by the drive shaft of the main movement and its conical seat on the upper end of the housing member;

Fig. 4 is a horizontal sectional view taken on the plane indicated by the line 4—4 of Fig. 2.

In accordance with the present invention, there is provided a main movement for gas meters comprising a tubular steel housing 1. The upper end of this housing is formed with plain straight screw threads 2. The threaded end 2 of the housing 1 is adapted to be received in a plain threaded socket 3 provided in the top web 4 of the main body case 5 of the meter. Arranged centrally and axially within the housing member 1 is a valve-driving shaft 6. In this instance, the shaft 6 carries a semi-spherical seating element 8 which is adapted for engagement with the straight conical tapered walls of a seat 9 formed on an annular bearing 10, the latter having a pressed fit engagement with the recessed upper end of the housing member 1. Thus, the top end of the housing member screws into the top web 4 of the main meter case, and is provided with a lock nut, shown at 11, which is adapted to be tightened against the under surface of the web 4 to permanently hold the adjusted positions of the housing.

This construction is contrasted with the tapered threads provided on the upper end of the housing members of the prior art, and which, when tightened, arbitrarily limit the operating positions of the housing member preventing adjustment thereof as is often required in securing proper operating positions on the part of the various elements of the movement. The housing is preferably made from seamless steel tubing and, therefore, is not subject to bending or distortion, as are the housing members heretofore constructed when composed of a molded or cast part of soft metal. Midway of its length, the exterior of the housing may be provided with opposed flat surfaces 12 adapted for the reception of a wrench, not shown, employed in rotating the housing member in securing or disconnecting the same to and from the web 4. The lower end of the housing is recessed, in the same manner as the upper end thereof, for the reception of a pressed fit, but replaceable, bearing disk 13. The bearings 10 and 13 may be formed, if desired, from oil-impregnated bronze, and while there is but little wear on the shaft-receiving surfaces of the bearing disks, it will be understood that the same may be replaced from time to time with other disks when wear takes place. The ball-shaped seating element 8 possesses a line contact with the conical surfaces of the bearing 10, so that the shaft 6 maintains itself in an aligned position. Furthermore, gas seepage through the bearing is made difficult as a result of the firm seating of the element 8 in the bearing 10.

The lower end of the drive shaft includes the usual crank-like tangent which includes the arms 14, the latter being linked, as at 15, with brackets 16 held by the rigid inner pans 17 of a pair of vertically arranged pulsating diaphragms 18. The diaphragms are spaced horizontally, providing between them, within the case, a main movement compartment 19, and on their outer sides, diaphragm chambers 20. The chambers 20 are formed by removable front and back cover plates 21 and 22, respectively. The outer peripheral portions of the flexible diaphragms 18 are connected with flat rigid rings or frames 23 which are adapted to be bolted between the plates 21 and 22 and the case body 5, as is customary. As gas is admitted into and expelled from the chambers 20, alternate pulsating movement is imparted to the diaphragms, and this movement, in turn, is translated through the linkage 15 and tangent arms 14, to rotate the shaft 6.

The upper end of the shaft 6 receives a crank arm or upper tangent 24. The outer end of this tangent carries an upstanding pointed stud 25 which engages with a socket formed in the underside of an eccentrically rotatable valve disk 26. The latter is mounted in a chamber formed in the top case 27 of the meter, and the valve operates to cover and uncover passages 28 by which gas under pressure is conducted to and from the diaphragm chambers 20. The upper face of the valve disk is provided as usual with a stud 29 which engages with a crank extension 30 formed at the lower end of an index driving shaft 31, the index or indicator mechanism being housed in the top case. It will be understood that the tangent arms 14, the linkage 15, the diaphragms 17 and 18, the tangent arm 24, the valve disk 26, and the meter mechanism form no direct part of the present invention, since the present invention is to be found in the construction of the main movement composed of the housing member 1, its mounting in the case wall 4, the drive shaft 6, and the bearing mechanism employed in the rotatable support of the drive shaft, all as defined in the following claims.

I claim:

1. A main movement for gas meters comprising: a rigid housing member of elongated tubular formation, said member having internal recesses at both ends thereof; longitudinally spaced removable bearings positioned in said recesses; a main drive shaft passing centrally through said bearings, one of said bearings being formed with a conical seat; a semispherical seating element rigid with said drive shaft and engageable with the conical seat of said bearing, the outer portion of said housing member being formed with straight threads adapted for engagement with similarly formed threads of a socket formed in an associated meter case to provide for vertical bodily adjustment of said housing member relative to said case; and a lock nut provided on the threads of said housing member for locking the latter to an associated meter case.

2. A diaphragm-actuated main movement for fluid flow-registering meters comprising: an elongated tubular housing member; straight screw threads of uniform diameter provided on the upper part of said housing member at one end thereof for threaded engagement with an associated meter case; a lock nut adjustable on said threads for retaining said housing member in adjusted operative positions with respect o the associated meter case, said housing member including an internal bore extending longitudinally therethrough, the opposite ends of said bore being formed with annular recesses; longitudinally spaced replaceable bearings stationarily seated in the recessed ends of said bore, the lower of said bearings being formed with a straight shaft-receiving axial opening, the upper of said bearings being formed with a substantially conical shaft-receiving opening arranged in axial alignment with the openng in the lower of said bearings; a drive shaft extending through said housing member and said bearings; and a seating element having a substantially spherical surface, said seating element being rigidly carried by said drive shaft and disposed with the spherical surface thereof in engagement with the conical surface of said upper bearing to effect a self-aligning support of the drive shaft by said upper bearing.

References Cited in the file of this patent

UNITED STATES PATENTS

| 722,389 | Sprague | Mar. 10, 1903 |
| 986,423 | Coleman | Mar. 7, 1911 |
| 1,668,078 | Huettig | May 1, 1928 |
| 2,223,555 | Derbyshire | Dec. 3, 1940 |
| 2,307,175 | Wainwright | Jan. 5, 1943 |

FOREIGN PATENTS

| 385,143 | France | May 2, 1908 |
| 431,390 | Germany | July 13, 1926 |
| 312,744 | Great Britain | June 6, 1929 |
| 297,989 | Italy | June 24, 1932 |